(12) United States Patent
Graham et al.

(10) Patent No.: US 8,782,218 B1
(45) Date of Patent: Jul. 15, 2014

(54) ACTIVITY STREAM BASED ALERT PROCESSING FOR INFORMATION TECHNOLOGY INFRASTRUCTURE

(75) Inventors: Stephen G. Graham, Chapel Hill, NC (US); Thomas R. Maguire, Brewster, NY (US); Salvatore DeSimone, III, Woodbury, CT (US)

(73) Assignee: EMC Corporation, Hopkinton, MA (US)

( * ) Notice: Subject to any disclaimer, the term of this patent is extended or adjusted under 35 U.S.C. 154(b) by 104 days.

(21) Appl. No.: 13/334,749

(22) Filed: Dec. 22, 2011

(51) Int. Cl.
G06F 15/16 (2006.01)

(52) U.S. Cl.
USPC .............................. 709/224; 709/201; 714/48

(58) Field of Classification Search
USPC .................................... 709/201, 224; 714/48
See application file for complete search history.

(56) References Cited

U.S. PATENT DOCUMENTS

| | | | |
|---|---|---|---|
| 6,748,432 B1* | 6/2004 | Du et al. ....................... | 709/224 |
| 2002/0099786 A1* | 7/2002 | Chun ............................. | 709/215 |
| 2004/0162810 A1* | 8/2004 | Jeon ................................. | 707/1 |
| 2004/0225923 A1* | 11/2004 | Teegan et al. .................. | 714/38 |
| 2009/0164761 A1 | 6/2009 | Bolt et al. | |
| 2009/0171866 A1 | 7/2009 | Harun et al. | |
| 2011/0225170 A1* | 9/2011 | Obasanjo et al. ............. | 707/748 |
| 2012/0116987 A1* | 5/2012 | Hering et al. ................. | 705/348 |
| 2013/0035164 A1* | 2/2013 | Osvald et al. .................. | 463/42 |

OTHER PUBLICATIONS

J. Snell et al., "JSON Activity Streams 1.0," May 2011, 25 pages.
D. Crockford, "The Application/JSON Media Type for JavaScript Object Notation (JSON)," Network Working Group, Request for Comments: 4627, Jul. 2006, 14 pages.
U.S. Appl. No. 13/170,345, filed in the name of A. Juels et al. on Jun. 28, 2011 and entitled "Service Window Optimized System Alert Engine.".

* cited by examiner

*Primary Examiner* — David Lazaro
*Assistant Examiner* — Marie Georges Henry
(74) *Attorney, Agent, or Firm* — Ryan, Mason & Lewis, LLP

(57) ABSTRACT

An activity stream based alert processor is configured to receive product-specific alerts from respective products implemented in information technology infrastructure, and to process the product-specific alerts to generate one or more activity streams using a specified activity stream format suitable for delivery to one or more remediation elements. For example, the activity streams may be generated in a standardized activity stream format suitable for delivery to one or more social networking applications to facilitate collaborative remediation of the product-specific alerts by multiple administrative entities, such as network, storage and server administrators. The alerts in an illustrative embodiment may comprise system management alerts generated by respective software products or other products in cloud infrastructure of a cloud service provider.

18 Claims, 3 Drawing Sheets

ACTIVITY STREAM BASED ALERT PROCESSING FOR INFORMATION TECHNOLOGY INFRASTRUCTURE

FIELD

The field relates generally to information processing, and more particularly to alert processing in information technology infrastructure.

BACKGROUND

An increasing number of companies and other enterprises are reducing their costs by migrating portions of their information technology infrastructure to cloud service providers. For example, virtual data centers and other types of systems comprising distributed virtual infrastructure are coming into widespread use. Commercially available virtualization software such as VMware® vSphere™ may be used by cloud service providers to build a variety of different types of virtual infrastructure, including private and public cloud computing and storage systems, which may be distributed across hundreds of interconnected computers, storage devices and other physical machines. Typical cloud service offerings include, for example, Infrastructure-as-a-Service (IaaS), Platform-as-a-Service (PaaS), and Software-as-a-Service (SaaS).

In cloud-based information processing system arrangements of the type described above, a wide variety of different hardware and software products are often deployed, many of which may be from different vendors, resulting in a complex system configuration. Handling system management alerts as well as other types of product-specific alerts in such an environment can be particularly challenging.

Under typical conventional practice, alerts from each product or set of similar products may be delivered to an appropriate administrator with associated graphic views such as tables and charts. Different administrators, such as network, storage and server administrators, may receive alerts from different portions of the system, and mechanisms for sharing such alerts among the administrators are very limited.

As a result, these and other conventional alerting arrangements provide insufficient opportunity for the administrators to coordinate provision of appropriate remedial actions for the various alerts generated by products deployed within the system.

SUMMARY

Illustrative embodiments of the invention provide techniques for activity stream based alert processing that facilitate collaborative remediation of system management alerts and other types of alerts in an information processing system.

In one embodiment, an activity stream based alert processor is configured to receive product-specific alerts from respective products implemented in information technology infrastructure, and to process the product-specific alerts to generate one or more activity streams using a specified activity stream format suitable for delivery to one or more remediation elements. For example, the activity streams may be generated in a standardized activity stream format suitable for delivery to one or more social networking applications to facilitate collaborative remediation of the product-specific alerts by multiple administrative entities, such as network, storage and server administrators. The alerts may comprise system management alerts generated by respective software products or other products in cloud infrastructure of a cloud service provider.

One or more of the illustrative embodiments advantageously overcome the above-noted drawbacks of conventional alerting approaches. For example, the activity stream based alert processor may be configured to correlate and combine alerts from complex arrangements of diverse hardware and software products deployed within information technology infrastructure into serialized activity streams that can be easily delivered to and processed by various remediation elements of the system, including social networking applications that support interaction between multiple administrative entities. This considerably facilitates the provisioning of effective alerting, particularly in large-scale public or private clouds using distributed virtual infrastructure, thereby improving system performance.

DETAILED DESCRIPTION

Illustrative embodiments of the present invention will be described herein with reference to exemplary information processing systems and associated servers, computers, storage devices and other processing devices. It is to be appreciated, however, that the invention is not restricted to use with the particular illustrative system and device configurations shown. Accordingly, the term "information processing system" as used herein is intended to be broadly construed, so as to encompass, for example, processing systems comprising private or public cloud computing or storage systems, as well as other types of processing systems comprising physical or virtual processing resources in any combination.

Figure 1:
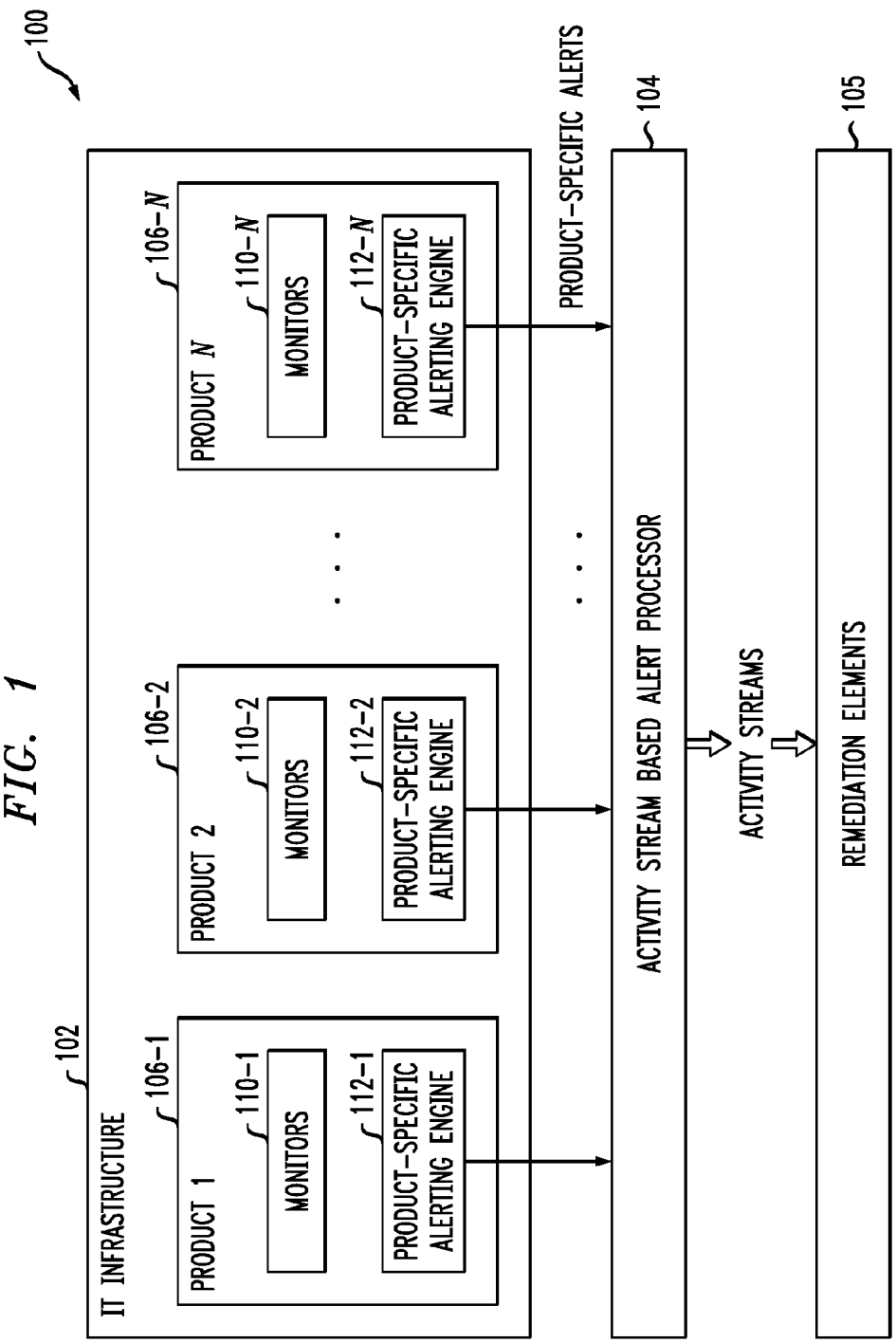
FIG. 1 is a block diagram of an information processing system that incorporates an activity stream based alert processor in an illustrative embodiment.

FIG. 1 shows an information processing system 100 configured in accordance with an illustrative embodiment of the present invention. The information processing system 100 comprises information technology (IT) infrastructure 102, an activity stream based alert processor 104 and remediation elements 105. The IT infrastructure 102 may comprise, for example, cloud infrastructure of a cloud service provider, and includes a plurality of products 106-1, 106-2, . . . , 106-N, each comprising a set of one or more monitors 110 and a product-specific alerting engine 112.

The products 106, also denoted Product 1, Product 2, . . . Product N, may comprise software or hardware products in any combination. Although each product 106 is shown as comprising a corresponding product-specific alerting engine in this embodiment, in other embodiments two or more of the products 106 may each share the same alerting engine, such that product-specific alerts from these multiple products are generated by the common alerting engine. The term "product-specific alert" as used herein is therefore intended to be broadly construed, so as to encompass, for example, an alert that originates from a particular hardware or software product but is combined with alerts from one or more other products. An "alert" may be a system management alert, which may be configured for processing by a system management tool or by an administrative entity, or other type of notification indicative of a condition in or relating to the associated product.

The activity stream based alert processor 104 is configured to provide an interface between the products 106 and the remediation elements 105. In operation, the activity stream based alert processor 104 receives product-specific alerts from respective ones of the products 106 implemented in the IT infrastructure 102, and processes the product-specific alerts to generate one or more activity streams using a specified activity stream format suitable for delivery to the remediation elements 105. For example, the activity stream based alert processor 104 may generate the activity streams in a standardized activity stream format suitable for delivery to one or more social networking applications within remediation elements 105 in order to facilitate collaborative remediation of the product-specific alerts by multiple administrative entities.

It should be noted that although the activity stream based alert processor 104 in the present embodiment receives the product-specific alerts directly from the products 106, such as by delivery from the products to the alert processor over respective network connections, this is by way of example only, and in other embodiments various types of indirect delivery mechanisms may be used to convey product-specific alerts from the products to the alert processor. For example, the above-noted common alerting engine shared by multiple products may be coupled to a network that is also coupled to the products and to the alert processor, such that the alerts are provided from the products to the alert processor via the common alerting engine over multiple network connections. Thus, one or more networks may be used to interconnect the various components of system 100.

Standardized activity stream formats that may be used in embodiments of the invention include an activity stream format that utilizes JavaScript Object Notation or JSON, as described in IETF RFC 4627, "The application/json Media Type for JavaScript Object Notation (JSON)," July 2006, which is incorporated by reference herein.

As a more particular example of an activity stream format that uses JSON, the standardized activity stream format may comprise a format specified by the Activity Streams Working Group, such as a standardized activity stream format compatible with the JSON Activity Streams 1.0 specification. This exemplary specification describes the serialization of a stream of social activities using the JSON format, but in embodiments of the invention the specification may be used to combine product-specific alerts from multiple distinct products in order to facilitate collaborative remediation. Other embodiments may utilize different activity stream formats, such as activity stream formats based on eXtensible Mark-up Language (XML) or other mark-up languages.

A given activity stream generated by the activity stream based alert processor 104 may comprise a serial activity stream characterizing a sequence of individual activities defined in accordance with an object-based activity model, where the model includes for a given one of the activities at least one object that characterizes performance of the given activity. For example, the object may denote an entity performing the activity, an entity on which the activity is performed, and an identifier of the given activity. As another example, an activity may comprise an actor, a verb, an object, and a target, and may characterize performance of an action on or with an object. One or more of the components of the activity may be explicit or implicit. Activities expressed in this format provide sufficient metadata to allow presentation in a rich human-friendly format.

The activity stream based alert processor 104 may be implemented on a common processing platform with other portions of the system 100, or alternatively may be implemented at least in part on one or more separate processing platforms. Examples of processing platforms suitable for implementing at least a portion of one or more of the IT infrastructure 102, activity stream based alert processor 104 and remediation elements 105 of system 100 will be described in conjunction with FIGS. 3 and 4.

Also, although shown in FIG. 1 as being separate from the IT infrastructure 102, at least a portion of one or more of the activity stream based alert processor 104 and the remediation elements 105 may be implemented within the IT infrastructure 102. It is also to be understood that a given embodiment of the system 100 may include multiple instances of the elements 102, 104 and 105, although only single instances of such elements are shown in the system diagram for clarity and simplicity of illustration.

Figure 2:
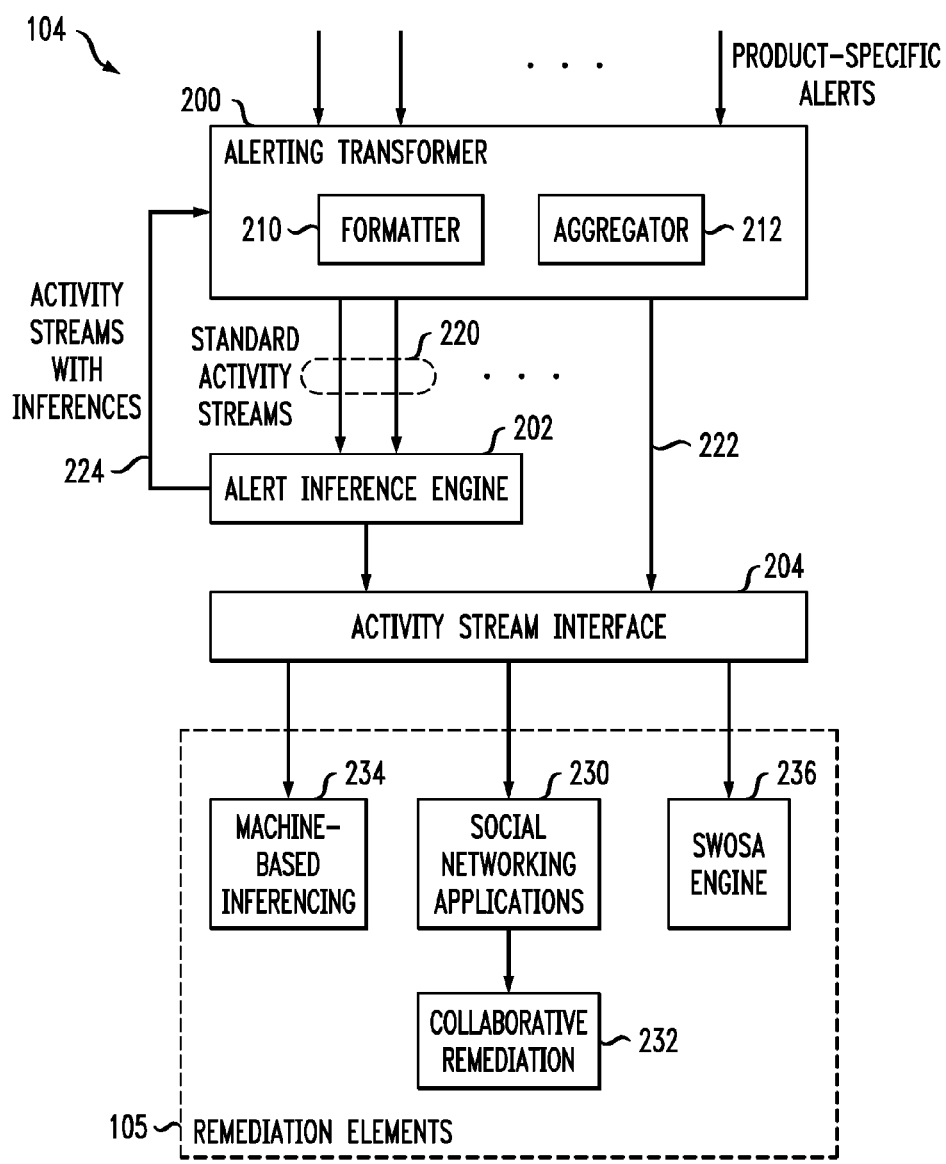
FIG. 2 shows a more detailed view of portions of the FIG. 1 system.

Referring now to FIG. 2, a portion of the information processing system 100 is shown in greater detail. In this embodiment, the activity stream based alert processor 104 comprises an alerting transformer 200, an alert inference engine 202 and an activity stream interface 204. The alerting transformer 200 receives product-specific alerts from the products 106, directly or indirectly via one or more intermediate devices, and processes those alerts using a formatter module 210 and an aggregator module 212. The formatter module 210 formats the alerts into a format suitable for inclusion into an activity stream, using the object-based model previously described. The aggregator module 212 combines alerts from multiple products to facilitate inclusion in activity streams. The output of the alerting transformer 200 is a set of standard activity streams, one or more of which comprise the formatted and aggregated product-specific alerts received from the products 106. A number of the activity streams 220 are applied to respective inputs of the alert inference engine 202, and at least one other activity stream 222 bypasses the alert inference engine 202 and is applied directly to the activity stream interface 204.

The alert inference engine 202 generates one or more inferences for each of at least a subset of the activity streams 220. These inferences, which may indicate relationships between activity streams or relationships between the alerts contained in those streams, are fed back to the alerting transformer 200 with the corresponding activity streams via the feedback path 224, in order to facilitate subsequent transformation of additional product-specific alerts into additional activity streams.

The activity stream interface 204 provides one or more of the activity streams to remediation elements 105. In this embodiment, the remediation elements comprise social networking applications 230 for providing a collaborative remediation environment 232, and further include a machine-based inferencing element 234, and a service window optimized system alert (SWOSA) engine 236. Various possible implementations of a SWOSA engine suitable for use in embodiments of the present invention are described in greater detail in U.S. patent application Ser. No. 13/170,345, filed Jun. 28, 2011 and entitled "Service Window Optimized System Alert Engine," which is commonly assigned herewith and incorporated by reference herein.

It is to be appreciated that the particular sets of modules and other components as implemented in the system 100 as illustrated in FIGS. 1 and 2 are presented by way of example only. In other embodiments, only subsets of these components, or additional or alternatives sets of components, may be used, and such components may exhibit alternative functionality and relationships.

An advantage of the illustrative embodiment of FIG. 2 is that it allows alerts from complex arrangements of diverse hardware and software products 106 deployed within IT infrastructure 102 to be combined into serialized activity streams that can be easily delivered to and processed by various remediation elements 105 of the system, including social networking applications 230 that support interaction between multiple administrative entities, such as network, storage and server administrators. Remediation of alerts is therefore made much more efficient, leading to improved system performance.

Figure 3:
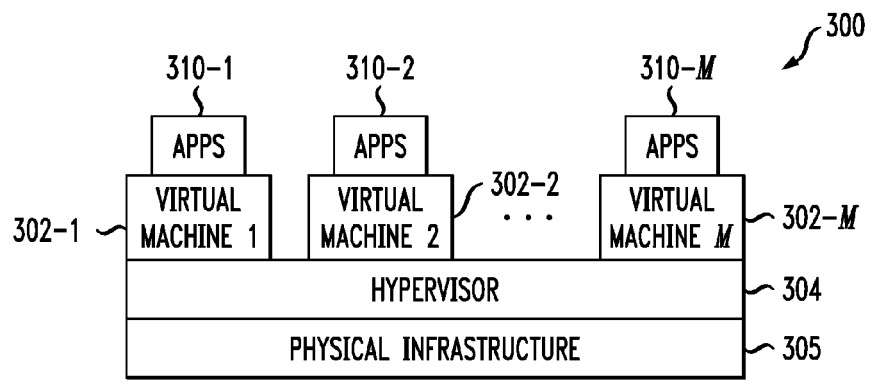
FIG. 3 shows one possible embodiment of cloud infrastructure that may be utilized to implement at least a portion of the FIG. 1 system.

As shown in FIG. 3, portions of the IT infrastructure 102 may comprise cloud infrastructure 300. The cloud infrastructure 300 comprises virtual machines (VMs) 302-1, 302-2, . . . 302-M implemented using a hypervisor 304. The hypervisor 304 is an example of what is more generally referred to herein as "virtualization infrastructure." The hypervisor 304 runs on physical infrastructure 305. The cloud infrastructure 300 further comprises sets of applications 310-1, 310-2, . . . 310-M running on respective ones of the virtual machines 302-1, 302-2, . . . 302-M under the control of the hypervisor 304.

It is also possible that the cloud infrastructure may encompass other portions of the system 100, such as portions of the activity stream based alert processor 104 and one or more of the remediation elements 105.

Although only a single hypervisor 304 is shown in the embodiment of FIG. 3, the system 100 may of course include multiple hypervisors each providing a set of virtual machines using at least one underlying physical machine.

An example of a commercially available hypervisor platform that may be used to implement hypervisor 304 and possibly other portions of the IT infrastructure 102 in one or more embodiments of the invention is the VMware® vSphere™ which may have an associated virtual infrastructure management system such as the VMware® vCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of the IT infrastructure 102 of system 100.

As indicated previously, the system 100 may be implemented using one or more processing platforms. One or more of the processing modules or other components of system 100 may therefore each run on a computer, server, storage device or other processing platform element. A given such element may be viewed as an example of what is more generally referred to herein as a "processing device." The cloud infrastructure 300 shown in FIG. 3 may represent at least a portion of one processing platform. Another example of such a processing platform is processing platform 400 shown in FIG. 4.

The processing platform 400 in this embodiment comprises a portion of the system 100 and includes a plurality of processing devices, denoted 402-1, 402-2, 402-3, . . . 402-K, which communicate with one another over a network 404.

The processing device 402-1 in the processing platform 400 comprises a processor 410 coupled to a memory 412. The processor 410 may comprise a microprocessor, a microcontroller, an application-specific integrated circuit (ASIC), a field programmable gate array (FPGA) or other type of processing circuitry, as well as portions or combinations of such circuitry elements. The memory 412 may be viewed as an example of what is more generally referred to herein as a "computer program product" having executable computer program code embodied therein. Such a memory may comprise electronic memory such as random access memory (RAM), read-only memory (ROM) or other types of memory, in any combination.

The computer program code when executed by a processing device such as the processing device 402-1 causes the device to perform functions associated with one or more of the modules or other components of system 100, such as the activity stream based alert processor 104. One skilled in the art would be readily able to implement such software given the teachings provided herein. Other examples of computer program products embodying aspects of the invention may include, for example, optical or magnetic disks, or other storage devices, or suitable portions or combinations of such devices. In addition to storing computer program code, such storage devices will also generally be used to store data within system 100.

Also included in the processing device 402-1 is network interface circuitry 414, which is used to interface the processing device with the network 404 and other system components. Such circuitry may comprise conventional transceivers of a type well known in the art.

The other processing devices 402 of the processing platform 400 are assumed to be configured in a manner similar to that shown for processing device 402-1 in the figure.

Again, the particular processing platform 400 shown in the figure is presented by way of example only, and system 100 may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network, such as a wide area network (WAN), a local area network (LAN), a satellite network, a telephone or cable network, or various portions or combinations of these and other types of networks.

Figure 4:
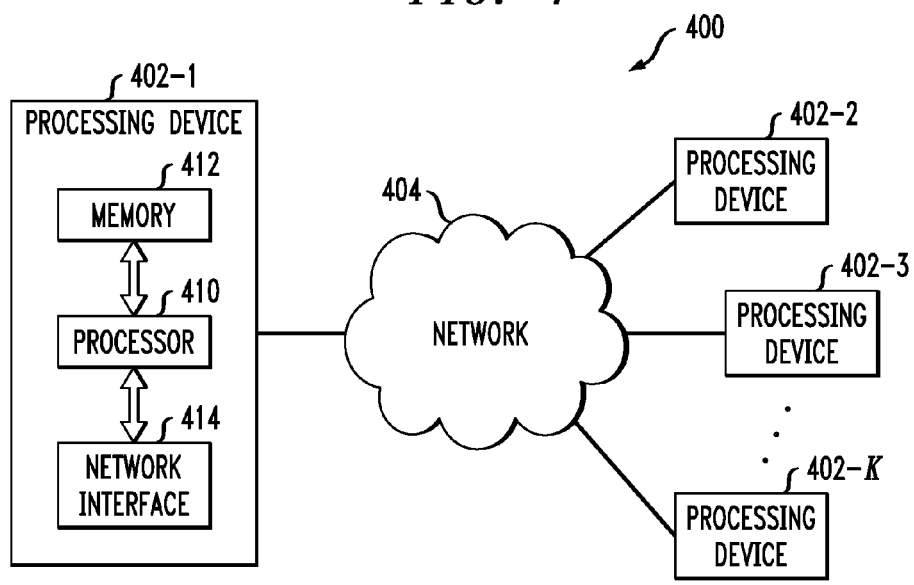
FIG. 4 shows one possible embodiment of a processing platform that may be utilized to implement at least a portion of the FIG. 1 system.

As indicated previously, activity stream based alert processing functionality as disclosed herein can be implemented at least in part in the form of one or more software programs stored in memory and executed by a processor of a processing device such as one of the virtual machines 302 of FIG. 3 or one of the processing devices 402 of FIG. 4. A memory having such program code embodied therein is an example of what is more generally referred to herein as a "computer program product."

It should again be emphasized that the above-described embodiments of the invention are presented for purposes of illustration only. Many variations may be made in the particular arrangements shown and described. For example, although described in the context of particular system and device configurations, the techniques are applicable to a wide variety of other types of information processing systems, processing devices and IT infrastructure arrangements. Numerous other embodiments within the scope of the appended claims will be readily apparent to those skilled in the art.

What is claimed is:

1. A method comprising the steps of:
receiving product-specific alerts from respective products implemented in information technology infrastructure; and
processing the product-specific alerts to generate one or more activity streams using a specified activity stream format suitable for delivery to one or more remediation elements, wherein the specified activity stream format comprises a standardized activity stream format that combines product-specific alerts from multiple distinct products in order to facilitate collaborative remediation of the product-specific alerts by multiple administrative entities;
wherein the product-specific alerts comprise system management alerts generated by one or more product-specific alerting engines associated with said products based on outputs of one or more monitors implemented within respective ones of the products; and
wherein the receiving and processing steps are performed by at least one processing device comprising a processor coupled to a memory and implementing an activity stream based alert processor configured to provide an interface between the products and said one or more remediation elements;
wherein the processing step further comprises generating one or more inferences for each of at least a subset of the one or more activity streams, with said inferences being utilized to facilitate subsequent transformation of additional product-specific alerts into additional activity streams.

2. The method of claim 1 where the standardized activity stream format comprises a format suitable for delivery to one or more social networking applications.

3. The method of claim 1 wherein the standardized activity stream format comprises an activity stream format that utilizes one of JavaScript Object Notation (JSON) and eXtensible Mark-up Language (XML).

4. The method of claim 1 wherein the standardized activity stream format comprises a format specified by the Activity Streams Working Group.

5. The method of claim 4 wherein the standardized activity stream format is compatible with the JSON Activity Streams 1.0 specification.

6. The method of claim 1 wherein at least one of the one or more activity streams comprises a plurality of individual activities defined in accordance with an object-based activity model and corresponding to respective ones of the alerts, the object-based activity model comprising for a given one of the activities at least one object that characterizes performance of the given activity.

7. The method of claim 6 wherein the object denotes one or more of an entity performing the activity, an entity on which the activity is performed, and an identifier of the given activity.

8. The method of claim 1 wherein the activity stream based alert processor comprises an activity stream interface for providing said one or more activity streams to each of the one or more remediation elements, the remediation elements including one or more of a machine-based inferencing remediation element, a social network collaborative remediation element, and a service window optimized remediation element.

9. The method of claim 1 wherein one or more of the products comprise respective software products running on a processing platform of a service provider.

10. A computer program product comprising a non-transitory processor-readable storage medium having encoded therein executable code of one or more software programs, wherein the one or more software programs when executed cause said processing device to perform the steps of the method of claim 1.

11. An apparatus comprising:
at least one processing device comprising a processor coupled to a memory, said at least one processing device implementing an activity stream based alert processor configured to provide an interface between a plurality of products implemented in information technology infrastructure and one or more remediation elements;
wherein the activity stream based alert processor is configured to receive product-specific alerts from respective ones of the products implemented in the information technology infrastructure, and to process the product-specific alerts to generate one or more activity streams using a specified activity stream format suitable for delivery to said one or more remediation elements, wherein the specified activity stream format comprises a standardized activity stream format that combines product-specific alerts from multiple distinct products in order to facilitate collaborative remediation of the product-specific alerts by multiple administrative entities;
wherein the product-specific alerts comprise system management alerts generated by one or more product-specific alerting engines associated with said products based on outputs of one or more monitors implemented within respective ones of the products; and
wherein the activity stream based alert processor comprises an alert inference engine and an alerting transformer, the alter inference engine being configured to generate one or more inferences for each of at least a subset of the one or more activity streams, with said inferences being utilized by the alerting transformer to facilitate subsequent transformation of additional product-specific alerts into additional activity streams.

12. The apparatus of claim 11 wherein the standardized activity stream format comprises a format suitable for delivery to one or more social networking applications.

13. The apparatus of claim 11 wherein the alerting transformer comprises formatter and aggregator modules for processing the product-specific alerts.

14. The apparatus of claim 11 wherein the activity stream based alert processor comprises an activity stream interface for providing the one or more activity streams to each of the one or more remediation elements, the remediation elements including one or more of a machine-based inferencing remediation element, a social network collaborative remediation element, and a service window optimized remediation element.

15. The apparatus of claim 11 wherein said at least one processing device is implemented within cloud infrastructure of a cloud service provider, said cloud infrastructure comprising physical infrastructure and associated virtualization infrastructure running on the physical infrastructure.

16. An information processing system comprising:
information technology infrastructure comprising a plurality of products; and
an activity stream based alert processor configured to receive product-specific alerts from respective ones of the products of the information technology infrastructure, and to process the product-specific alerts to generate one or more activity streams using a specified activity stream format suitable for delivery to one or more remediation elements, wherein the specified activity stream format comprises a standardized activity stream format that combines product-specific alerts from multiple distinct products in order to facilitate collaborative remediation of the product-specific alerts by multiple administrative entities;

wherein the product-specific alerts comprise system management alerts generated by one or more product-specific alerting engines associated with said products based on outputs of one or more monitors implemented within respective ones of the products;

wherein the information technology infrastructure is implemented using at least one processing platform comprising a plurality of processing devices; and wherein the activity stream based alert processor comprises an alerting transformer and an alert inference engine, the alert inference engine being configured to generate one or more inferences for each of at least a subset of the one or more activity streams, with said inferences being utilized by the alerting transformer to facilitate subsequent transformation of additional product-specific alerts into additional activity streams.

17. The system of claim 16 wherein the standardized activity stream format comprises a format suitable for delivery to one or more social networking applications.

18. The system of claim 16 wherein the alerting transformer comprises formatter and aggregator modules for processing the product-specific alerts.

* * * * *